(12) United States Patent
Ono et al.

(10) Patent No.: US 7,460,256 B2
(45) Date of Patent: Dec. 2, 2008

(54) CONTROLLING A PERIPHERAL UNIT BY CONVERTING AN INSTRUCTION TO DELETE CERTAIN INFORMATION THEREFROM

(75) Inventors: Takashi Ono, Toride (JP); Yasuyuki Shinada, Abiko (JP); Tatsuo Kimura, Toride (JP); Yukio Nohata, Abiko (JP); Takashi Imai, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 11/438,432

(22) Filed: May 23, 2006

(65) Prior Publication Data

US 2007/0103709 A1 May 10, 2007

Related U.S. Application Data

(62) Division of application No. 09/585,607, filed on Jun. 2, 2000, now Pat. No. 7,110,125.

(30) Foreign Application Priority Data

| Jun. 25, 1999 | (JP) | ................. 1999-180005 |
| Feb. 29, 2000 | (JP) | ................. 2000-53421 |

(51) Int. Cl.
*G06F 15/00* (2006.01)
*H04N 1/04* (2006.01)

(52) U.S. Cl. .................. 358/1.13; 358/474
(58) Field of Classification Search .......... 358/1.1, 358/1.13, 1.14, 1.15, 1.18, 401, 404, 442, 358/444, 451, 468, 448, 474
See application file for complete search history.

(56) References Cited

U.S. PATENT DOCUMENTS

| 5,239,388 | A | 8/1993 | Matsumoto | 358/448 |
| 5,267,055 | A | 11/1993 | Sakamoto et al. | 358/461 |
| 5,390,031 | A | 2/1995 | Kang et al. | 358/468 |
| 5,434,679 | A | 7/1995 | Kondo et al. | 358/451 |
| 5,452,095 | A | 9/1995 | Ono et al. | 358/296 |
| 5,696,812 | A | 12/1997 | Ono | 379/88 |
| 5,726,769 | A | 3/1998 | Imai et al. | 358/442 |
| 5,828,466 | A | 10/1998 | Imai et al. | 358/404 |
| 5,872,901 | A | 2/1999 | Konno et al. | 395/114 |
| 5,910,848 | A | 6/1999 | Ono | 358/404 |
| 5,930,004 | A | 7/1999 | Imai et al. | 358/442 |
| 5,933,246 | A | 8/1999 | Ono | 358/404 |
| 6,020,971 | A | 2/2000 | Kato et al. | 358/1.14 |
| 6,065,074 | A | 5/2000 | Minamizawa | 710/54 |
| 6,118,546 | A * | 9/2000 | Sanchez et al. | 358/1.6 |

(Continued)

FOREIGN PATENT DOCUMENTS

EP 0 602 967 A1 12/1993

(Continued)

*Primary Examiner*—Gabriel I Garcia
(74) *Attorney, Agent, or Firm*—Fitzpatrick, Cella, Harper & Scinto

(57) ABSTRACT

A peripheral unit is controlled by means of a driver in another apparatus, where an instruction sent to the peripheral unit contains both data produced by the driver and data produced by another application in the other apparatus. This is done by subjecting the instruction received from the other apparatus to processing in which the data produced by the other application is deleted.

6 Claims, 12 Drawing Sheets

U.S. PATENT DOCUMENTS

| | | | |
|---|---|---|---|
| 6,226,096 B1 | 5/2001 | Ouchi | 358/1.14 |
| 6,278,526 B1 | 8/2001 | Kurozasa | 358/1.15 |
| 6,466,329 B1 | 10/2002 | Ouchi | 358/1.14 |
| 7,110,125 B1* | 9/2006 | Ono et al. | 358/1.13 |
| 2001/0012126 A1* | 8/2001 | Mori | 358/434 |
| 2001/0017708 A1* | 8/2001 | Kobayashi et al. | 358/1.13 |

FOREIGN PATENT DOCUMENTS

| | | |
|---|---|---|
| EP | 0 778 692 A | 9/1996 |
| EP | 0 778 692 A2 | 6/1997 |
| EP | 0 789 479 A2 | 8/1997 |
| JP | A 07-087293 | 3/1995 |
| JP | 08-185295 A | 7/1996 |
| JP | A 08-185295 | 7/1996 |
| JP | 10-136131 A | 5/1998 |
| JP | A 10-136131 | 5/1998 |
| WO | WO 88-68824 | 9/1988 |

* cited by examiner

CONTROLLING A PERIPHERAL UNIT BY CONVERTING AN INSTRUCTION TO DELETE CERTAIN INFORMATION THEREFROM

CROSS-REFERENCE TO RELATED APPLICATIONS

This application is a divisional of U.S. patent application Ser. No. 09/585,607, filed Jun. 2, 2000, now U.S. Pat. No. 7,110,125, and claims benefit of the filing date of that application, and priority benefit of the filing dates of Japanese patent applications nos. 11-180005, filed Jun. 25, 1999, and 2000/053421, filed Feb. 29, 2000. The entire disclosure of each of those prior applications is incorporated herein by reference.

BACKGROUND OF THE INVENTION

1. Field of the Invention

The present invention relates to (i) a data processing apparatus which can be connected to an information processing terminal, such as a personal computer, and which can perform printer control processing, via a printer control unit, for controlling the printing of data from the information processing terminal, as well as various other types of processing based on instructions from the information processing terminal, (ii) a data processing apparatus which can be connected to an apparatus capable of operating as a peripheral apparatus, and which can generate data for causing the peripheral apparatus to print, and (iii) to a method for controlling such apparatuses.

2. Description of the Related Art

It has been proposed to incorporate a printer for a personal computer (hereinafter abbreviated as a "PC") into a facsimile apparatus, for the purpose of utilizing the incorporated printer as a printer for the facsimile apparatus.

FIG. 13 is a block diagram illustrating the configuration of a conventional system implementing such an integration.

In FIG. 13, the main body 2 of a facsimile apparatus includes a printer unit for performing processing for printing an image, and a facsimile (hereinafter abbreviated as "FAX") unit for performing processing other than printing. An existing printer for a PC is used as the printer unit.

First, the configuration of the FAX unit will be described.

A FAX control unit 31 controls the entire FAX unit. The FAX control unit 31 performs control in accordance with a control program stored in a FAX ROM (read-only memory) 32. A RAM (random access memory) 33 provides working areas for the FAX control unit 31, and also stores various data. A reading unit 34 reads an image from an original, and generates either binary or multiple-valued image data for each pixel of the read image. A MODEM (modulator-demodulator) 35 performs modulation/demodulation of data for the purpose of facsimile transmission/reception. An NCU (network control unit) 36 operates as an interface with a public network, such as a telephone network 44, or the like, and is connected to the telephone network 44 via a connector 42. An I/F (interface) controller (peripheral unit) 37 performs transmission/reception of data with a PC connected via a connector 41 and a cable 45, using a predetermined I/F, such as a Centronics interface, conforming to IEEE 1284, or the equivalent, and a protocol for the I/F. A buffer memory 38 stores data used in facsimile communication, and the like. An I/F controller (host unit) 39 transfers data (received data or read data) from the FAX unit to the printer unit, using a protocol for the I/F similar to the protocol used by the I/F controller 37. The I/F controller (host unit) 39 operates with respect to the printer unit as if data is directly transferred from the host apparatus (PC) (i.e., it operates as a host PC). A system bus 40 interconnects respective units within the FAX unit. An I/F signal line 43 transfers data from the PC or the FAX unit to the printer unit. An I/F signal line 46 exchanges control information, such as state information, or the like, between the FAX unit and the printer unit. Switches 47 and 48 control whether data to be transferred to the printer unit is from the PC or the FAX unit, and are themselves controlled by control signals from the FAX control unit 31 via signal lines 49 and 50, respectively.

Next, the configuration of the printer unit will be described.

The printer control unit 61 controls the entire printer unit. The printer control unit 61 performs control in accordance with a control program stored in the printer ROM 62. A RAM 63 provides working areas for the printer control unit 61, and also stores various data. A recording control unit 64 controls the processing of image data for recording and recording operations in accordance with instructions from the printer control unit 61. Reference numeral 65 designates a recording head for ink-jet recording which is controlled by the recording control unit 64 and prints an image based on input data. An I/F controller 66 receives data transmitted in accordance with an I/F protocol conforming to IEEE 1284, or the equivalent. A system bus 67 interconnects the respective units within the printer unit.

In the above-described configuration, in order to set a facsimile mode in which the respective units of the FAX unit can be controlled from the PC, switches 47 and 48 are usually connected to I/F controllers 37 and 39, respectively. A command which can be interpreted by the FAX control unit 31 is received from the PC, and the FAX control unit 31 controls the operations of the respective units of the FAX unit in accordance with the command. Data from the PC is printed as follows. When a print request is transmitted from the PC, the FAX control unit 31 of the FAX unit switches switches 47 and 48 to connect to switch 48 and the I/F controller 66, respectively, creating a direct connection between the PC and the printer unit, thus causing the printer unit to operate as the existing printer. Printing-instruction data provided to the existing printer are input from the PC, and the printer control unit 61 controls the printing operation in accordance with the printing-instruction data.

Thus, it is possible to use the existing printer, and the PC can use a driver for the existing printer.

Conventionally, however, when printing data from the PC, the printing unit is set to operate as the existing printer. It is thus impossible to receive an instruction for other processing utilizing the FAX unit from the PC and execute the processing, until the end of the printing of the data from the PC is signalled by the I/F signal line 46 and the main control shifts from the printer control unit back to the FAX control unit.

SUMMARY OF THE INVENTION

It is an object of the present invention to provide a data processing apparatus, and a method for controlling the same, in which the above-described problems are solved.

It is a further object of the present invention to provide a data processing apparatus and a method for controlling the same in which an existing unit, such as a printer or the equivalent, can be utilized as a processing unit.

It is still another object of the present invention to provide a data processing apparatus, and a method for controlling the same, which can perform data processing utilizing an existing driver by converting data generated by the existing driver by another driver.

It is yet another object of the present invention to provide a data processing apparatus, and a method for controlling the same, in which processes using two drivers can be executed in parallel.

According to one aspect, the present invention relates to a data processing apparatus which includes a connection unit so it can be connected to an information processing terminal, such as a personal computer, or the equivalent, that is capable of causing a printer unit, for controlling the printing of data received from the information terminal via the connection unit, to print the data, and execute various other types of processing based on instructions received from the information processing terminal. The apparatus includes a receiver for receiving an instruction transmitted from the information processing terminal via the connection unit, analyzer for analyzing the instruction received by the receiver, a converter for converting the instruction received by the receiver into a format capable of being processed by the printer unit when the instruction received by the receiver is recognized as a print instruction directed to the printer unit as determined by the analysis of the analyzer, and a controller for transferring the instruction converted by the converter to the printer unit in order to cause the printer unit to print.

According to another aspect, the present invention relates to a method for controlling a data processing apparatus connected to an information processing terminal, such as a personal computer, or the like, and capable of causing a printer unit, for controlling the printing of data received from the information terminal, to print the data, and execute various other types of processing based on instructions received from the information processing terminal. The method includes a reception step of receiving an instruction transmitted from the information processing terminal, an analysis step of analyzing the instruction received in the reception step, a conversion step of converting the instruction received in the reception step into a format capable of being processed by the printer unit when the instruction received in the reception step is a print instruction directed to the printer unit, as determined by the analysis in the analysis step, and a control step of transferring the instruction converted in the conversion step to the printer unit in order to cause the printer unit to print.

According to yet another aspect, the present invention relates to a storage medium, capable of being read by a computer, which stores a program for controlling a data processing apparatus connected to an information processing terminal, such as a personal computer, or the equivalent, and which is capable of causing a printer unit, that controls the printing of data from the information terminal, to print the data, and is further capable of executing various other types of processing based on instructions from the information processing terminal. The program includes a reception step of receiving an instruction transmitted from the information processing terminal, an analysis step of analyzing the instruction received in the reception step, a conversion step of converting the instruction received in the reception step into a format capable of being processing by the printer unit when the instruction received in the reception step is a print instruction directed to the printer unit as determined by the analysis of the analysis step, and a control step of transferring the instruction converted in the conversion step to the printer unit to cause the printer unit to print.

According to yet another aspect, the present invention relates to a data processing apparatus which includes a connection unit so it can be connected to an information processing terminal, a first processing unit operating as a peripheral apparatus to the information processing terminal and connected to it via the connection unit, a first control unit for controlling the processing of the first processing unit, a second processing unit for performing processing directed by an instruction from the information processing terminal connected via the connection unit, and a second control unit for controlling the processing of the second processing unit. The second control unit includes a determiner for determining whether or not the processing directed by the instruction received from the information processing terminal via the connection unit is processing to be executed by the first processing unit, a converter for converting, when the determiner has determined that the processing directed by the instruction received from the information processing terminal via the connection unit is to be executed by the first processing unit, the instruction into a form capable of being processed by the first control unit, and an instruction transferor for transferring the instruction converted by the converter to the first control unit.

According to yet a further aspect, the present invention relates to a method for controlling a data processing apparatus which is connected to an information processing terminal and includes a first processing unit for performing processing based on an instruction from the information processing terminal, as well as a second processing unit for performing processing different from the processing of the first processing unit and for causing the first processing unit to perform processing. The method includes a determination step of determining whether or not the processing directed by the instruction from the information processing terminal is processing to be executed by the first processing unit, a conversion step of, when in the determination step it has been determined that the processing directed by the instruction is to be executed by the first processing unit, converting the instruction into a form capable of being processed by the first processing unit, and a transfer step of transferring the instruction converted in the conversion step to the first processing unit.

According to still another aspect, the present invention relates to a storage medium, capable of being read by a computer, storing a program for controlling a data processing apparatus which is connected to an information processing terminal, and which includes a first processing unit for performing processing directed by an instruction from the information processing terminal, as well as a second processing unit for performing processing different from the processing of the first processing unit and for causing the first processing unit to perform processing. The program includes a determination step of determining whether or not the processing directed by the instruction from the information processing terminal is processing to be executed by the first processing unit, a conversion step of, when in the determination step it has been determined that the processing directed by the instruction is to be executed by the first processing unit, converting the instruction into a form capable of being processed by the first processing unit, and a transfer step of transferring the instruction converted in the conversion step to the first processing unit.

According to still another aspect, the present invention relates to a data processing apparatus which includes a connector, arranged to be connected to a peripheral apparatus which includes a printer unit for printing an image, a data generator for generating printing data to cause the peripheral apparatus connected via the connector to print, a data processor for processing the printing data generated by the data generator into data to be processed by a unit other than the printer unit of the peripheral apparatus connected via the connector, and a data transferor for transferring the data processed by the data processor to the peripheral apparatus via the connector.

According to still another aspect, the present invention relates to a method for controlling a data processing apparatus connectable to a peripheral apparatus which includes a printer unit for printing an image. The method includes a generation step of generating printing data for causing the peripheral apparatus to perform printing, a processing step of processing the generated data into data to be processed by a unit other than the printer unit of the peripheral apparatus, and a transfer step of transferring the processed data to the peripheral apparatus.

According to still another aspect, the present invention relates to a storage medium, capable of being read by a computer, which stores a program for controlling a data processing apparatus connectable to a peripheral apparatus which includes a printer unit for printing an image. The program includes a generation step of generating printing data for causing the peripheral apparatus to perform printing, a processing step of processing the generated data into data to be processed by a unit other than the printer unit of the peripheral apparatus, and a transfer step of transferring the processed data to the peripheral apparatus.

According to still another aspect, the present invention relates to a data processing apparatus which includes a connector, arranged to be connected to a peripheral apparatus having a plurality of functions, a data generator for generating data to be processed by one of the functions of the peripheral apparatus connected via the connector, a data processor for processing the data generated by the data generator into data to be processed by another function of the peripheral apparatus connected via the connector, and a data transferor for transferring the data processed by the data processor to the peripheral apparatus connected via the connector.

According to still another aspect, the present invention relates to a method for controlling a data processing apparatus connectable to a peripheral apparatus having a plurality of functions. The method includes a generation step of generating data to be processed by one of the functions of the peripheral apparatus, a processing step of processing the generated data into data to be processed by another function of the peripheral apparatus, and a transfer step of transferring the processed data to the peripheral apparatus.

According to yet still another aspect, the present invention relates to a storage medium, capable of being read by a computer, storing a program for controlling a data processing apparatus connectable to a peripheral apparatus having a plurality of functions. The program includes a generation step of generating data to be processed by one of the functions of the peripheral apparatus, a processing step of processing the generated data into data to be processed by another function of the peripheral apparatus, and a transfer step of transferring the processed data to the peripheral apparatus.

The foregoing and other objects, advantages and features of the present invention will become more apparent from the following description of the preferred embodiments taken in conjunction with the accompanying drawings.

BRIEF DESCRIPTION OF THE DRAWINGS

FIG. 11 is a flowchart illustrating the flow of the processing within an uploading control task for transferring data stored within the facsimile apparatus to the PC;

DESCRIPTION OF THE PREFERRED EMBODIMENTS

A preferred embodiment of the present invention will now be described in detail with reference to the drawings.

Figure 1:
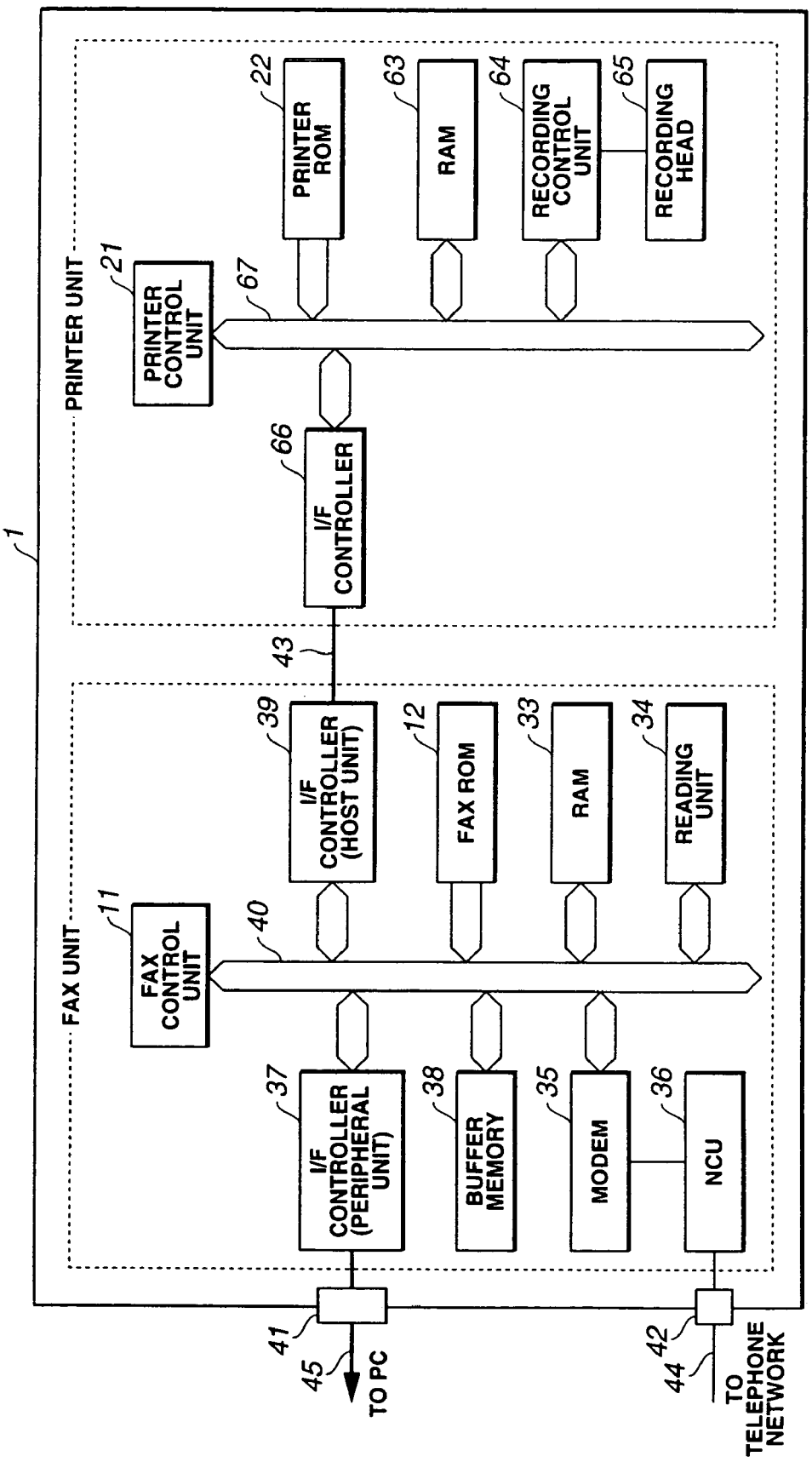
FIG. 1 is a schematic block diagram illustrating the configuration of a facsimile apparatus according to an embodiment of the present invention.

FIG. 1 is a block diagram illustrating the system configuration of a facsimile apparatus according to the embodiment.

Figure 13:
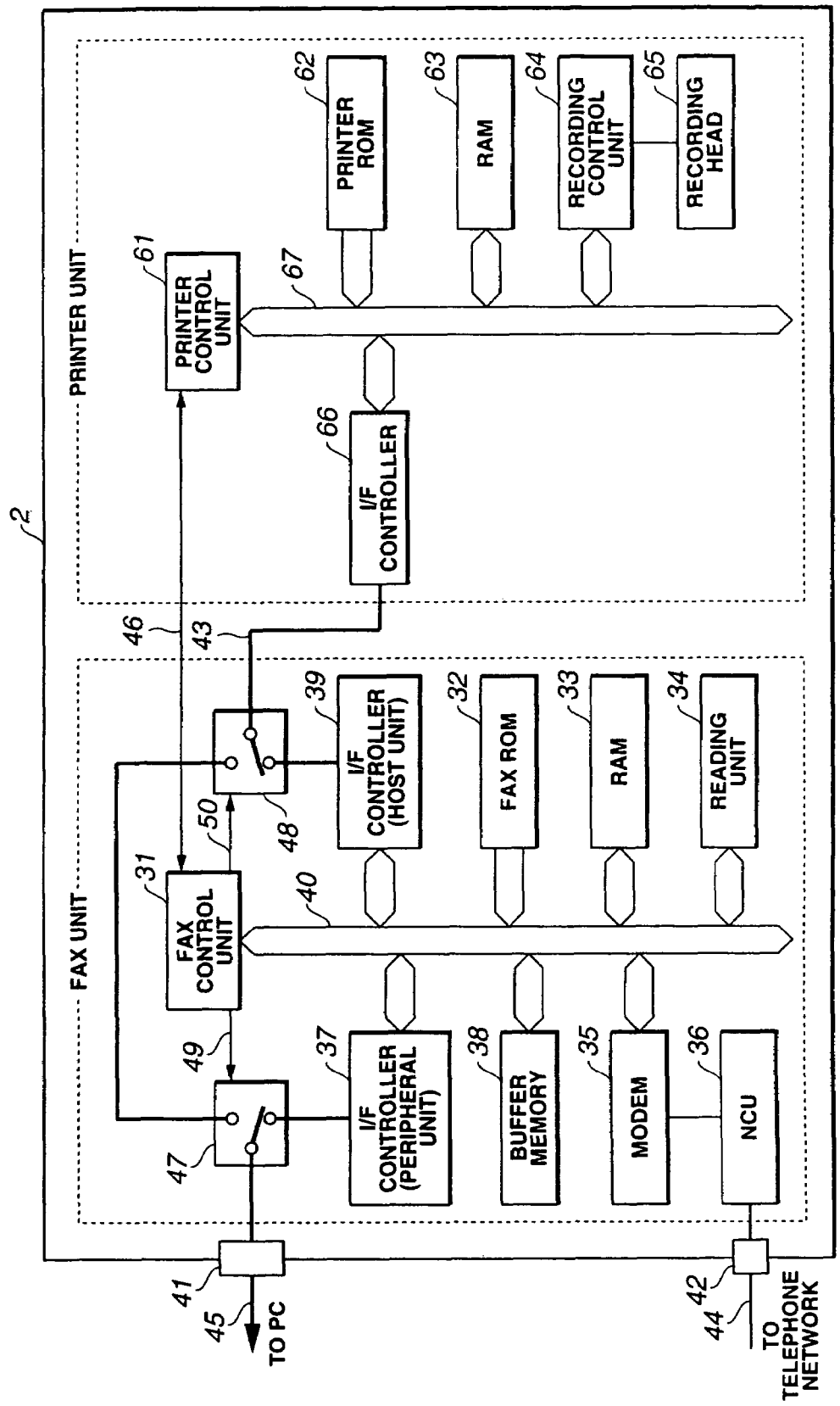
FIG. 13 is a block diagram illustrating the configuration of a system utilizing the conventional processing method.

In FIG. 1, as the facsimile apparatus 2 shown in FIG. 13, a facsimile apparatus 1 includes a FAX unit, and a printer unit, using an existing printer. In FIG. 1, components indicated by the same reference numerals as in the block diagram shown in FIG. 13 have the same functions. Hence, further description thereof will be omitted.

Reference numeral 11 designates a FAX control unit which controls the entire FAX unit. The FAX control unit 11 controls respective operations as directed by a control program for performing processing, to be described below, which is stored in the FAX ROM 12.

In contrast to the FAX unit of the facsimile apparatus 2 as shown in FIG. 13, the FAX unit of the facsimile apparatus 1 of the embodiment does not include switches for performing switching so as to directly transfer information transmitted from the PC to the printer unit.

Reference numeral 21 designates the printer control unit 21 which controls the entire printer unit of the embodiment. The printer control unit 21 controls respective operations as directed by a control program stored in the printer ROM 22. The printer unit of the facsimile apparatus 1 executes a printing operation in accordance with a command for the existing printer.

A command for the FAX control unit 11 is transmitted from the PC. The FAX control unit 11 interprets the command from the PC, and executes operation commands for respective units. A command for printing data from the PC is provided in the following manner. A command obtained by adding a command for the FAX control unit 11 to a command for an existing printer, or by converting such a command, is received. When the FAX control unit 11 interprets the received command as a command for printing an image based on data from the PC (a recording command), the command for the FAX control unit 11, or the converted portion in the received command, is removed. After converting the received command into a command for an existing printer, the resultant command is transferred to the printer control unit 21 of the printer unit.

In addition to the above-described command for causing the printer unit to print an image based on data from the PC, commands indicating various instructions can also be transmitted from the PC.

When the FAX control unit 11 has recognized that a scanning command has been transmitted from the PC, the reading unit 34 reads an image from an original, and generates image data representing the image. The image data is stored in the buffer memory 38.

When the FAX control unit 11 has recognized that an uploading command has been transmitted from the PC, data stored in the buffer memory 38 (such as image data from the reading unit 34, data received by facsimile communication via a telephone network 44, or the like) is transferred to the PC via the I/F controller 37.

When the FAX control unit 11 has recognized that a monitor command has been transmitted from the PC, the state of each unit of the facsimile apparatus 1 is reported to the PC via the I/F controller 37.

These operations will be described in greater detail below.

In addition to the above-described commands, various other commands, such as a command for performing facsimile transmission of data from the PC to a communication partner assigned by the PC via the telephone network 44, can be transmitted from the PC, and the facsimile apparatus 1 will operate as directed by these commands. However, further description thereof will be omitted.

Even if there is no instruction from the PC, or the facsimile apparatus 1 is not connected to the PC, the facsimile apparatus 1 can operate in the same manner as an existing stand-alone facsimile apparatus.

For example, the facsimile apparatus 1 can read an image from an original using the reading unit 34 as directed by an operator's instruction input through an operation panel provided on the facsimile apparatus 1, can modulate binary image data representing the image via a MODEM 35, and can perform the facsimile transmission of the modulated data to the communication partner assigned through the operation panel, can record an image based on image data received via the telephone network 44, demodulated by the MODEM 35, and converted into a resolution when the FAX control unit 11 causes the printer unit to print, on a recording sheet by the printer unit, or can record an image based on image data from the reading unit 34 on a recording sheet by the printing unit in accordance with an instruction for a copying operation entered by the operator through the operation panel.

When the facsimile apparatus 1 can normally communicate with the PC, the facsimile apparatus 1 can also perform an operation of temporarily storing image data, obtained by the reading of an image from an original by the reading unit 34 according to an instruction from application software for the facsimile apparatus 1 installed in the PC, in the buffer memory 38, then uploading the image data into the PC via the I/F controller 37, encoding the data so as to be used in facsimile by application software in the PC, downloading and again storing the resultant data in the buffer memory 37 via the I/F controller 37, and performing facsimile transmission of the data to a communication partner assigned by the application software in the PC via the telephone network 44 while sequentially modulating the data by the MODEM 35. The encoding may be performed by the FAX control unit 11.

Next, the PC connected to the facsimile apparatus 1 shown in FIG. 1 via a connector 41 will be described.

Figure 2:
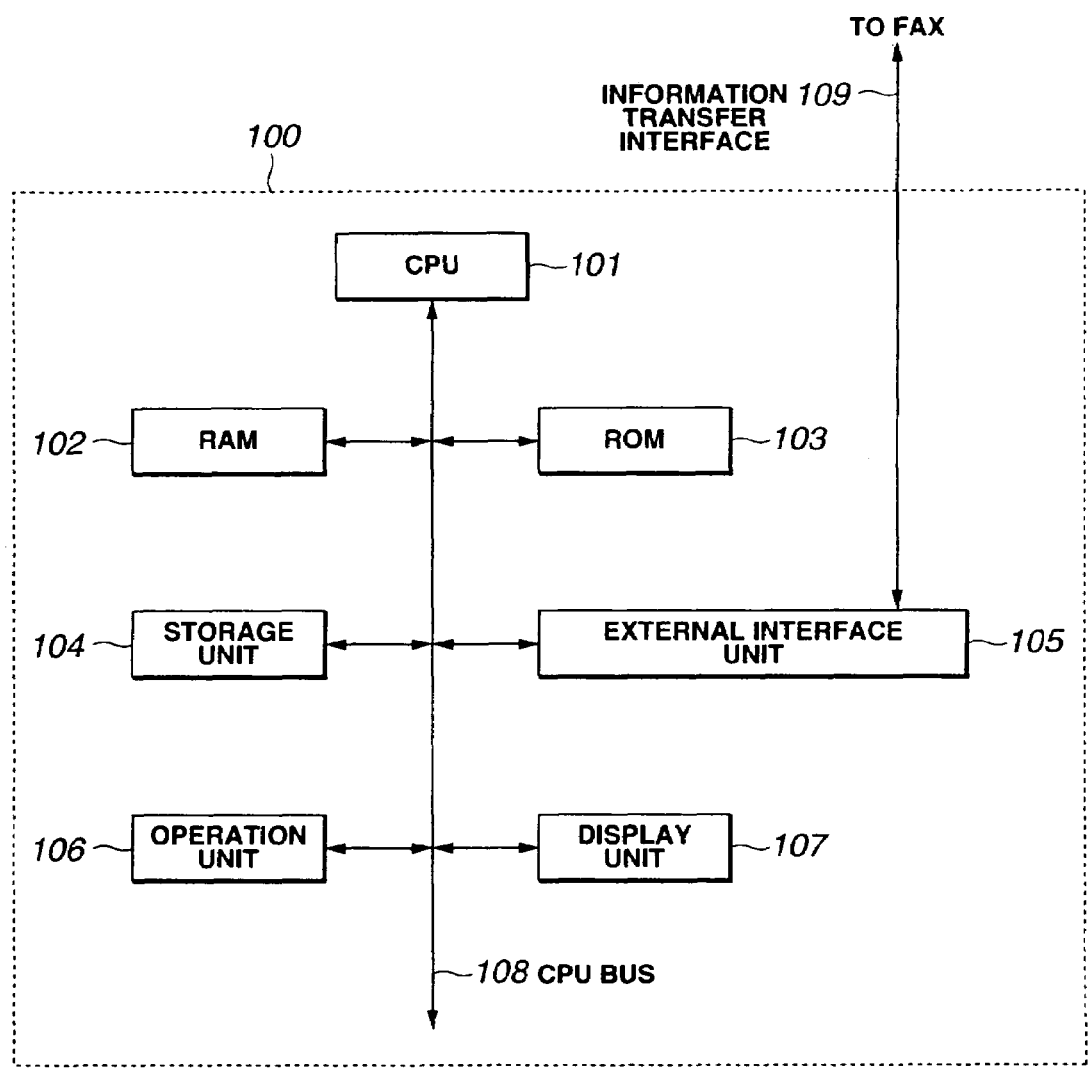
FIG. 2 is a schematic block diagram illustrating the configuration of a PC according to the embodiment.

FIG. 2 is a block diagram illustrating the system configuration of such a PC 100.

The PC 100 includes the following units. A CPU (central processing unit) 101 controls the entire PC 100. A nonvolatile RAM 102 executes operating systems and user programs, and is also used for working areas. A ROM 103 stores boot programs of the PC 100, and the like. A nonvolatile storage unit 104 stores system data, communication image data, read image data, recorded image data, setting data, various programs, and the like, of the PC 100. Setting data areas are nonvolatile areas for storing, for example, communication modes, such as the communication speed, and the like, reading modes, such as the reading resolution, and the like, recording modes, such as the recording resolution, and the like, of the facsimile apparatus 1.

An external interface unit 105 performs the transmission/reception of information relating to set data, and the like, between the facsimile apparatus 1 and the PC 100. An operation unit 106 includes a keyboard, a mouse, and the like, for entering commands to the PC 100 from the operator. Reference numeral 107 designates a display unit, such as a CRT (cathode-ray tube), or the like. The PC 100 displays a summary of setting data, a picture frame for editing setting data, or the like, on the display unit 107. A CPU bus 108 interconnects the respective units of the PC 100. An information transfer interface 109 connects the facsimile apparatus 1 to the PC 100.

Next, the configuration of a software module to be installed in the PC 100 will be described.

Figure 3:
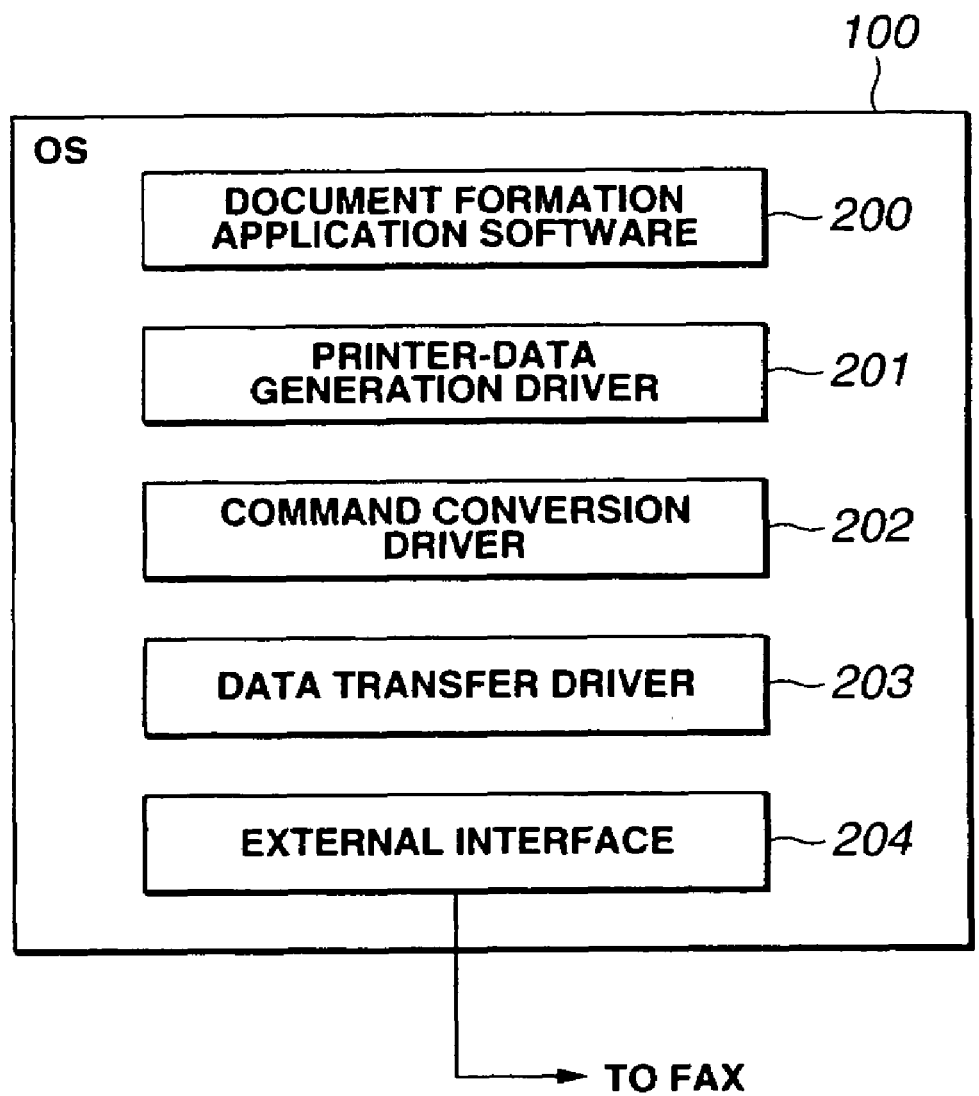
FIG. 3 is a schematic diagram illustrating the configuration of a module to be installed in the PC according to the embodiment.

FIG. 3 is a diagram illustrating the configuration of the software module of the PC 100.

In FIG. 3, document formation application software 200 is used by the user for forming a document or the like. Usually, the document formation application software is installed in an OS (operating system) for controlling the basic operations of the PC 100. The user can form, edit, store and print a document using an input device, such as a keyboard, a mouse, or the like. The application software is not limited to document formation. For example, image editing application software may be used.

The printer-data generation driver 201 is used by the printer unit within the facsimile apparatus 1 for analyzing the document formed by the document formation application software 200, converting the document into a printable data format, and generating printing data, including commands, for the printer unit. Usually, the printer-data generation driver 201 is dedicatedly designed so that the printer unit within the facsimile apparatus 1 can normally analyze data. In this embodiment, however, a printer driver dedicated for an existing printer (equivalent to the printer unit of the facsimile apparatus 1) may be used as this driver.

A command conversion driver 202 converts printing data generated by the printer-data generation driver 201 into a data format which can be interpreted by the FAX unit within the facsimile apparatus 1. The command conversion driver 202 is dedicatedly designed so that the FAX unit within the facsimile apparatus 1 can normally analyze data. Although not described in this specification, a FAX driver for forming, for example, data for FAX transmission, and a scanner driver for controlling a scanning operation would also be installed in the PC 100.

A data transfer driver 203 performs control of contention with another job when transferring data converted by the command conversion driver 202 to the facsimile apparatus 1. When a printing job has been generated according to a print instruction by the document formation application software 200, and a job, such as a status acquisition job, a scanning job, a FAX transmission job, or the like, has already been executed, the printing job is executed by trying simultaneous processing, in the case of a combination allowing simultaneous operations, such as a combination of printing and scanning, or a combination of printing and FAX transmission. In the case of a combination not allowing simultaneous processing, such as a combination of printing and printing, or a combination of printing and FAX reception/image recording, the printing job is temporarily held in a wait state, and the printing job is again started when the other job has been completed. The data transfer driver 203 performs such contention control.

An external interface 204 performs transmission/reception of data with the facsimile apparatus 1 using a predetermined protocol. This physical external interface 204 may execute either serial transfer, parallel transfer, network transfer, and radio transfer.

Next, a description will be provided of the flow of data processing when the facsimile apparatus 100 prints document data formed by the PC 100.

Figure 4:
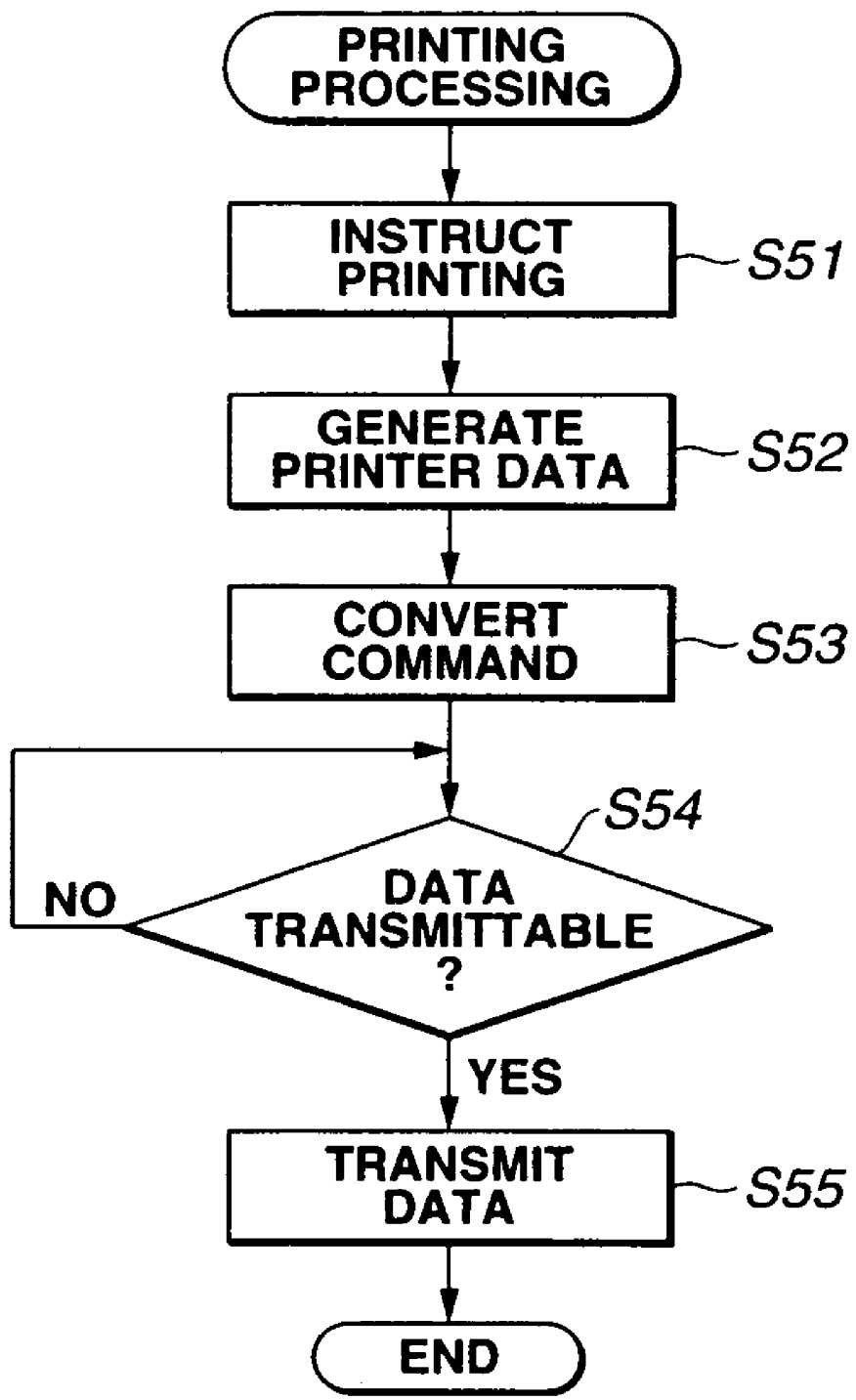
FIG. 4 is a flowchart illustrating an outline of the flow of data processing in the PC according to the embodiment.

FIG. 4 is a flowchart illustrating the flow of data processing at the PC 100 in this case. This flowchart illustrates the flow of processing controlled by the CPU 101 as directed by a program stored in the storage unit 104, or the like, which includes the group of the modules shown in FIG. 3.

In step S51, a print instruction is provided regarding a document file formed by the user according to the document formation application software 200, or the like, of the PC 100, using the keyboard, the mouse, or the like, of the operation unit 106.

In step S52, the printer-data generation driver 201 generates data which can be interpreted and printed by the printer unit within the facsimile apparatus 1 for the document file directed to be printed, and the generated data is temporarily stored in a storage region, such as the RAM 102 or the storage unit 104.

In step S53, the printing data generated and temporarily stored in the storage region is processed and converted into a data format interpretable by the FAX unit within the facsimile apparatus 1, and is again temporarily stored in the storage region. The processing in this case may be nothing more than the addition of a header command to the printing data, the addition of a header command and a footer command, or the compression or conversion processing of the printing data itself.

In step S54, the data transfer driver 203 determines if the data can be currently transmitted to the facsimile apparatus 1, while performing contention control with another job. If the result of the determination in step S54 is affirmative, the process proceeds to step S55. If the result of the determination is negative, the determination is repeated.

In step S55, the data converted and temporarily stored in the storage region in step S53 is transmitted to the facsimile apparatus 1 via the external interface 204.

Next, the processing at the facsimile apparatus 1 when printing data from the PC 100 by the printer unit will be briefly described.

Figure 5:
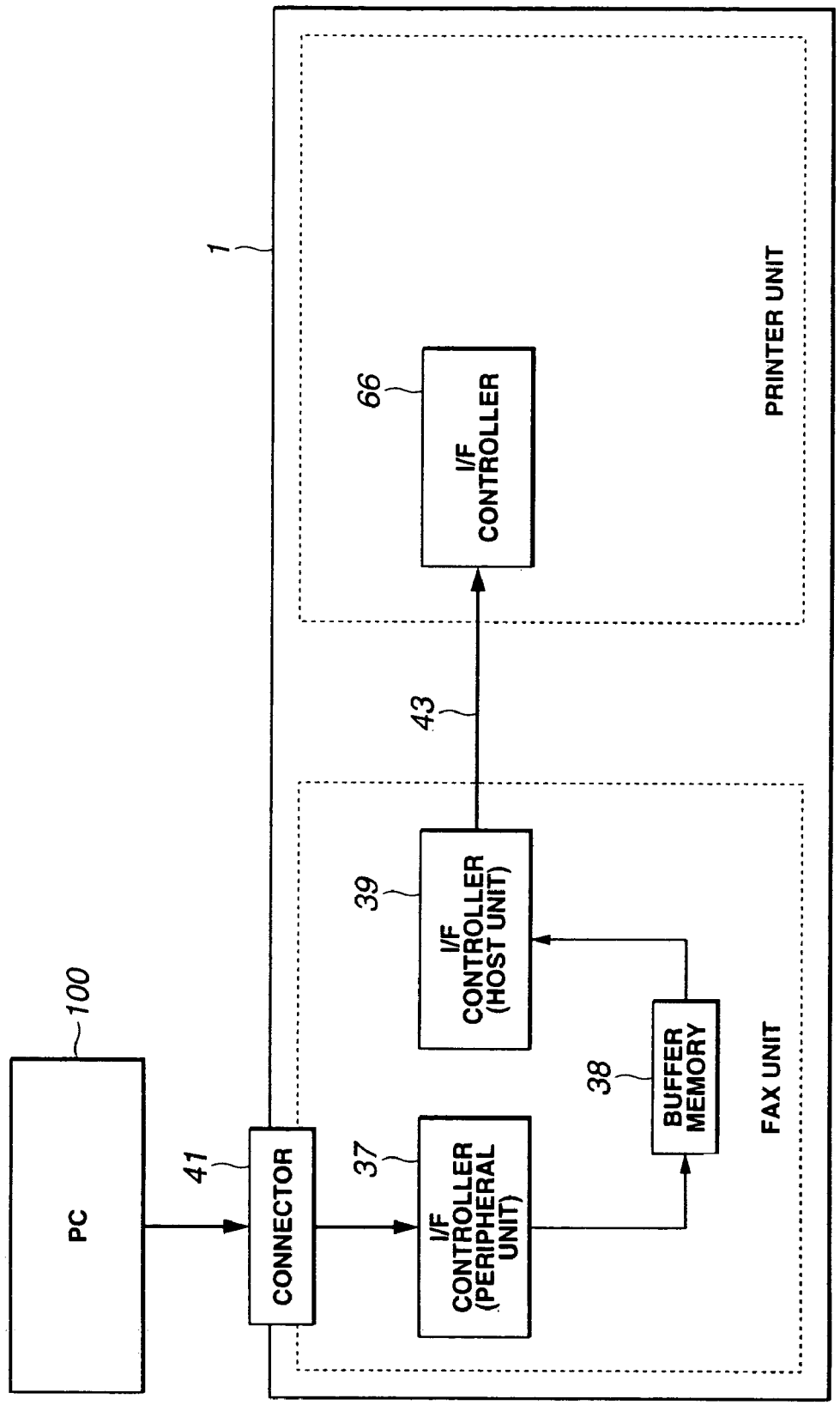
FIG. 5 is a diagram illustrating the flow of data when printing data from the PC in the embodiment.

FIG. 5 is a block diagram of the facsimile apparatus 1 illustrating the flow of data in this case.

Upon receipt of a command from the PC 100 via the I/F controller 37, the FAX control unit 11 interprets the command. When a recording instruction is included in the command, the FAX control unit 11 provides an instruction via the I/F controller 39 in order to start the printer unit by making the I/F controller 66 active. At the same time, data transmitted from the PC 100 via the I/F controller 37 is stored in the buffer memory 38. A portion for the FAX control unit 11 is removed or processed from data including the recording instruction received from the PC 100 (data formed as shown in FIG. 4), and the data is converted (restored) into a form interpretable by the printer control unit 21. The resultant data is transferred to the printer unit, which performs printing processing in accordance with a command generated by the printer-data generation driver 201, as described above.

That is, the FAX control unit 11 removes the data added for the FAX control unit 11 or restores processed data to original data (into the form output from the printer-data generation driver 201), and transmits this resultant data to the printer unit as existing data for an existing printer.

The printer unit may thus operate as if it prints data directly transmitted from the PC 100 as an existing printer.

An outline of the flow of data within the facsimile apparatus 1 in this case is indicated by the arrows shown in the block diagram of FIG. 5.

Next, a description will be provided of the exchange of data between the PC 100 and the facsimile apparatus 1, and the processing flow within the FAX unit as directed by the instructions from the PC 100, with reference to the flowcharts shown in FIGS. 6-11.

Each of these flowcharts indicates the processing flow controlled by the FAX control unit 11 as directed by a control program stored in the FAX ROM 12. The control program is divided into various tasks. Data is also provided from the printer control unit 21 of the printer unit based on the control program stored in the printer ROM 22. Command data for the FAX unit, including a driver for an existing printer, is transferred from the PC 100 to the facsimile apparatus 1. Application software for performing various types of processing for the facsimile apparatus 1 is installed in the PC 100. The facsimile apparatus 1 receives data from the application software or transmits data to the application software.

Figure 6:
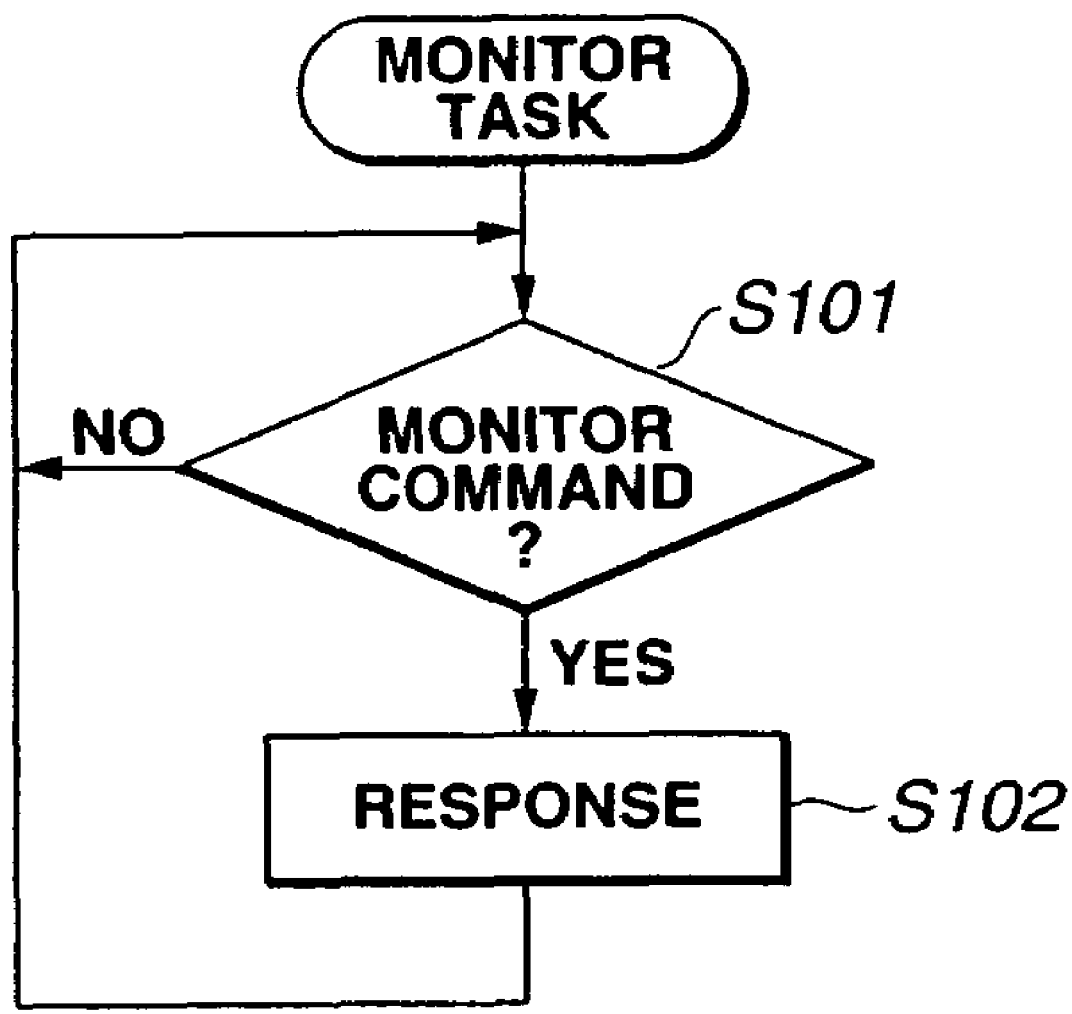
FIG. 6 is a flowchart illustrating the flow of processing within a monitor task for notifying the state of the facsimile apparatus to the PC.

FIG. 6 illustrates a monitor task for notifying the PC 100 of the status of the facsimile apparatus 1. When a monitor command is recognized as received from the PC 100 via the I/F controller 37 as a result of the determination in step S101, the process proceeds to step S102, where the current situation (a waiting state, a recording operation of the printer unit, an operation of reading an original by the reading unit 34, FAX reception, or the like) is signalled to the PC 100 via the I/F controller 37 in response to the command. This operation is repeated at a predetermined interval. The PC 100 provides the facsimile apparatus 1 with an instruction (a command) to execute each type of task, while monitoring the state of the facsimile apparatus 1. The state information to be provided to the PC 100 is set by changing the state of a status flag provided in a predetermined area of the RAM 33 based on notification from each task and information obtained by checking the state of each unit, and is displayed by being read by a monitor command from the PC 100.

Figure 7:
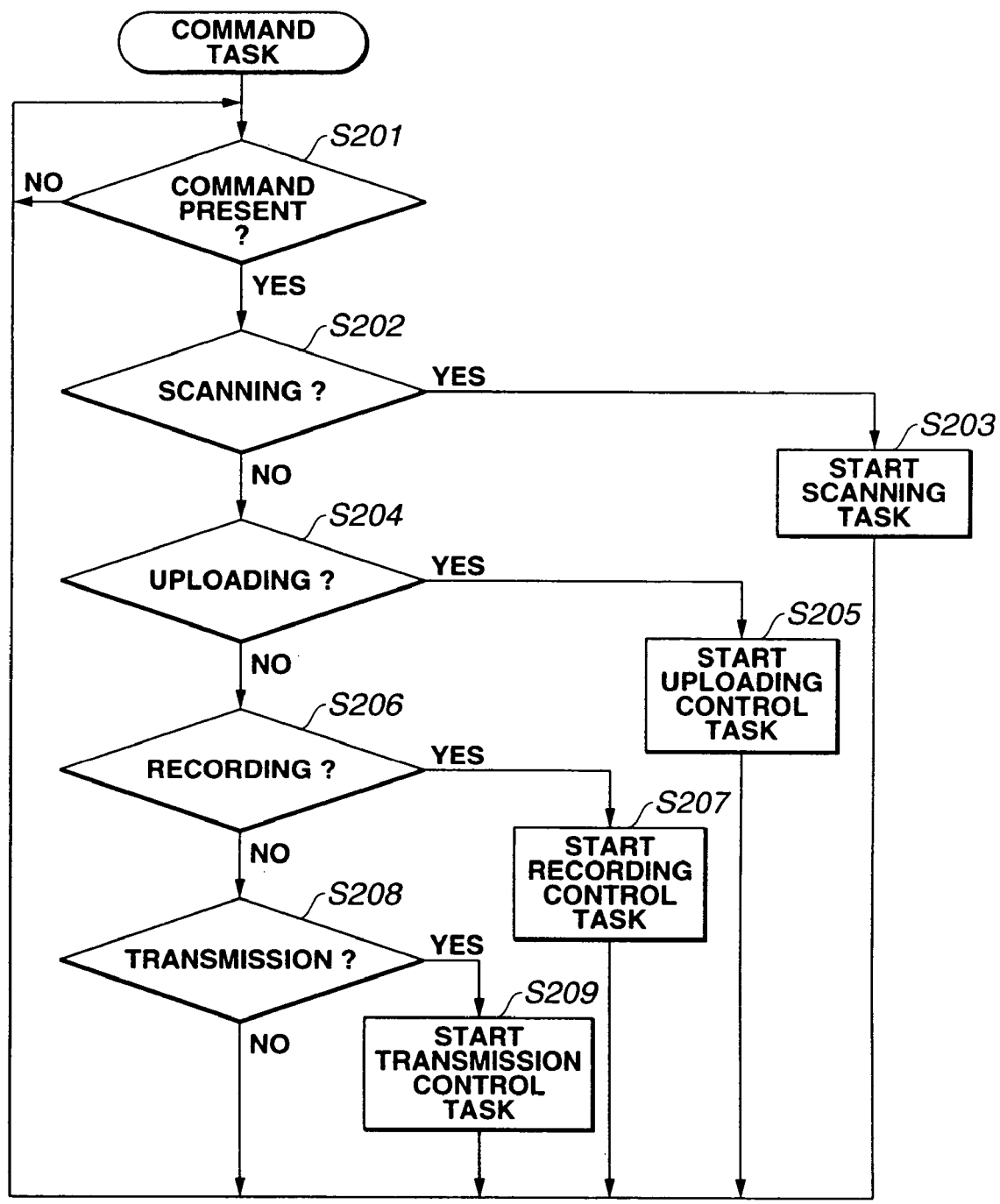
FIG. 7 is a flowchart illustrating the flow of a command task for receiving an operation instruction command from the PC.

FIG. 7 illustrates a command task for receiving a command for operating each unit of the facsimile apparatus 1 according to an instruction from the PC 100. Four operations, i.e., scanning, uploading, recording, and transmission, will be described with reference to FIG. 7.

When a command from the PC 100 is received in step S201, the contents of the command are analyzed.

If it is determined in step S202 that the received command is a scanning command for directing the reading unit 34 to read an original, the process proceeds to step S203, where a scanning task (to be described later) is started.

If the result of the determination in step S202 is negative, the process proceeds to step S204, where it is determined if the received command is an uploading command for transferring data stored in the buffer memory 38 of the facsimile apparatus 1 to the PC 100. If the result of the determination in step S204 is affirmative, the process proceeds to step S205, where an uploading control task (to be described later) is started.

If the result of the determination in step S204 is negative, the process proceeds to step S206, where it is determined if the received command is a recording command for causing the printing unit of the facsimile apparatus 1 to record data from the PC 100. If the result of the determination in step S206 is affirmative, the process proceeds to step S207, where a recording control task (to be described later) is started.

If the result of the determination in step S206 is negative, the process proceeds to step S208, where it is determined if the received command is a transmission command for causing the reading unit 34 to read an original and perform FAX transmission of the read image to an assigned communication partner. If the result of the determination in step S208 is affirmative, the process proceeds to step S209, where a transmission task (to be described later) is started.

As shown in FIG. 7, an instruction for starting each of these tasks can be received even after receipt of an instruction to start another task.

Figure 8:
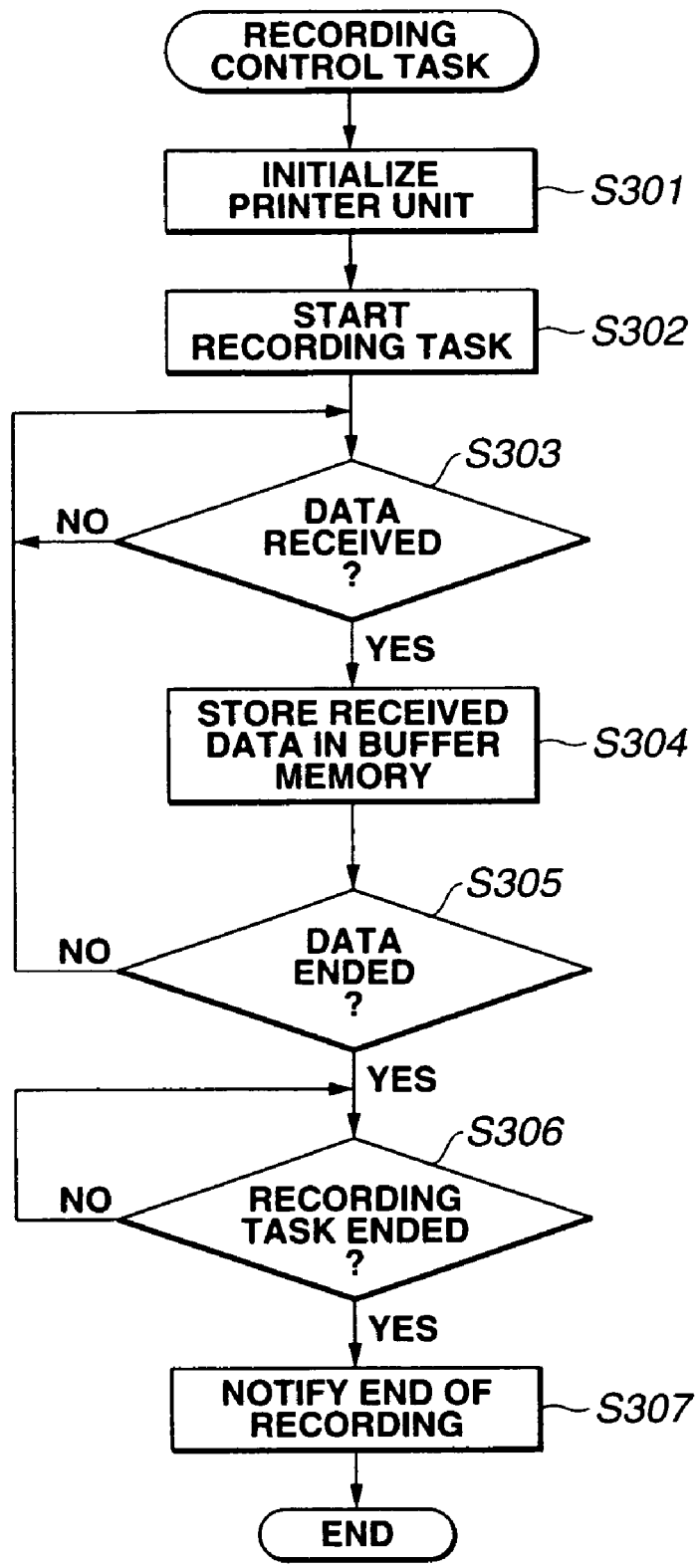
FIG. 8 is a flowchart illustrating the flow of the processing within a recording control task indicating the processing when receiving data for printing as directed by a recording instruction from the PC.

FIG. 8 illustrates a recording control task for controlling the exchange of data between the printer unit and the PC 100 upon receipt of a recording instruction from the PC 100.

When the recording control task directed by a recording instruction command has been started in step S206, then, in step S301, preparation for recording is performed by initializing the printer unit. Next, in step S302, data from the PC 100 is transmitted to the printer unit, and a recording task for performing recording processing (to be described later) is started.

In step S303, it is determined if the image data (in a data format dealt with in the FAX control unit 11) to be printed has been received from the PC 100 via the I/F controller unit 37. If the result of the determination in step S303 is affirmative, the process proceeds to step S304, where the received data is stored in the buffer memory 38. The processing of steps S303-S305 is repeated until it is determined, in step S305, that the data has ended.

When it has been determined in step S305 that image data to be printed has ended, the process proceeds to step S306, where the end of the recording task (end of the recording operation) is determined. If the result of the determination in step S306 is affirmative, the process proceeds to step S307, where a status flag indicating the end of recording of an image is raised in a predetermined area of the RAM 33. Thus, the end of the recording is relayed to the PC 100 in the monitor task shown in FIG. 6.

Figure 9:
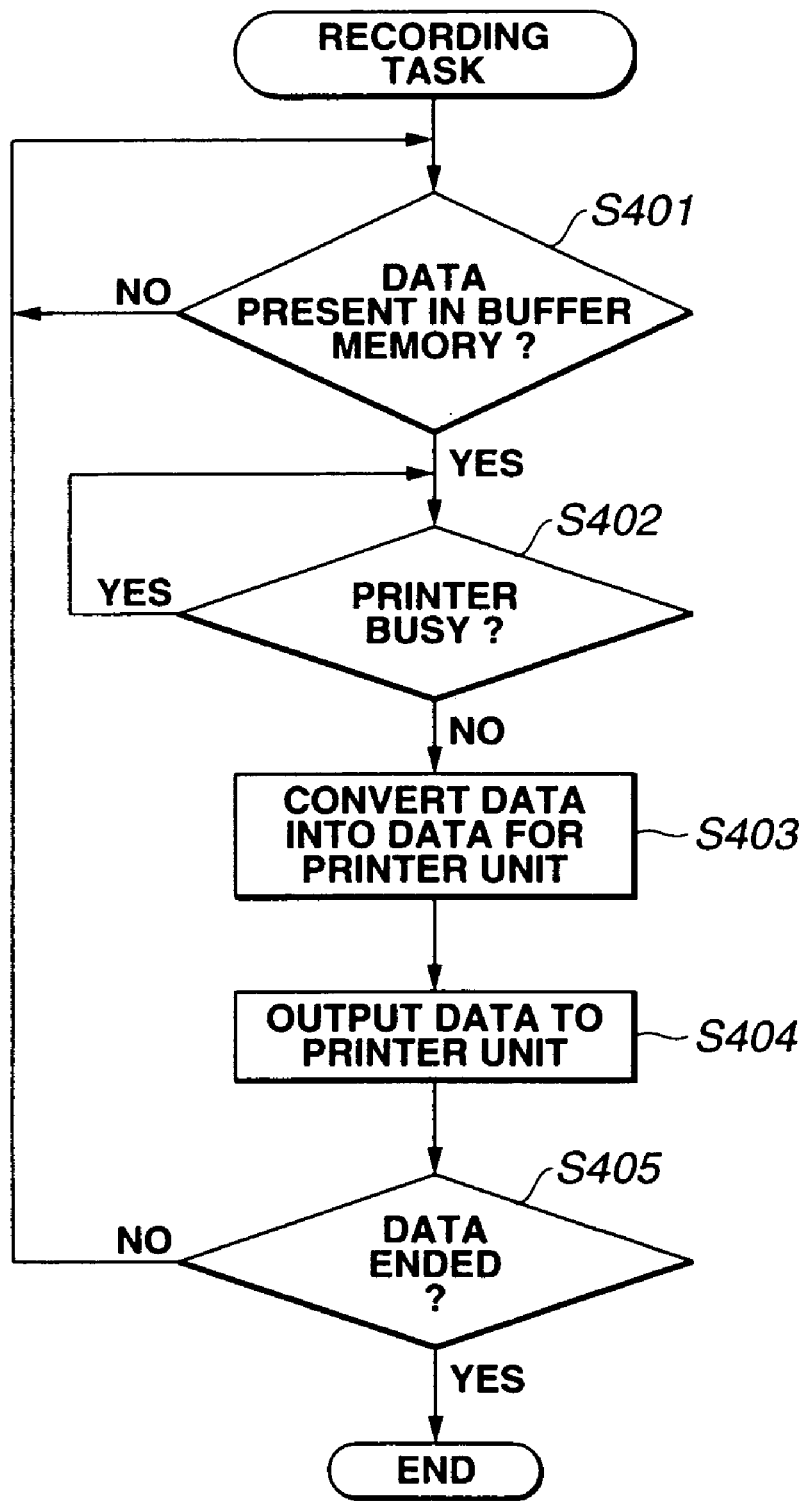
FIG. 9 is a flowchart illustrating the flow of the processing within a recording task indicating the processing when transmitting data to be recorded from the PC to a printer unit in order to print.

FIG. 9 illustrates a recording task for executing processing for recording by transferring image data to be recorded stored in the buffer memory 38 of the facsimile apparatus 1 to the printer unit.

When the recording task is started by receipt of a starting instruction in step S302, then, in step S401, it is determined if the image data to be transferred to the printer unit is stored in the buffer memory 38. If the result of the determination in step S401 is affirmative, the process proceeds to step S402, where it is determined if the image data to be transferred can be transferred to the printer unit, and the printer unit can receive the image data to be recorded. More specifically, it is determined if a busy signal is present on the I/F signal line 43. If the result of the determination in step S402 is negative, the process proceeds to step S403, where the image data to be recorded within the buffer memory 38 is converted into image data for recording for the printer control unit 21 by removing the information uniquely directed to the FAX control unit 11. Then, in step S404, the resultant image data is transferred to the printer unit via the I/F controller unit 39.

Image data is transferred to the printer unit by repeating the processing of steps S401-S404 until it is determined, in step S405, that the image data to be transferred has ended. The printer unit operates under the control of the printer control unit 21 as if data by an existing printer driver, including image data in a form adapted to the recording head 65, is directly received from the PC 100, and records an image represented by the image data on a recording sheet. When the processing of the recording task has ended, the end of the processing is signalled to the recording control task.

Figure 10:
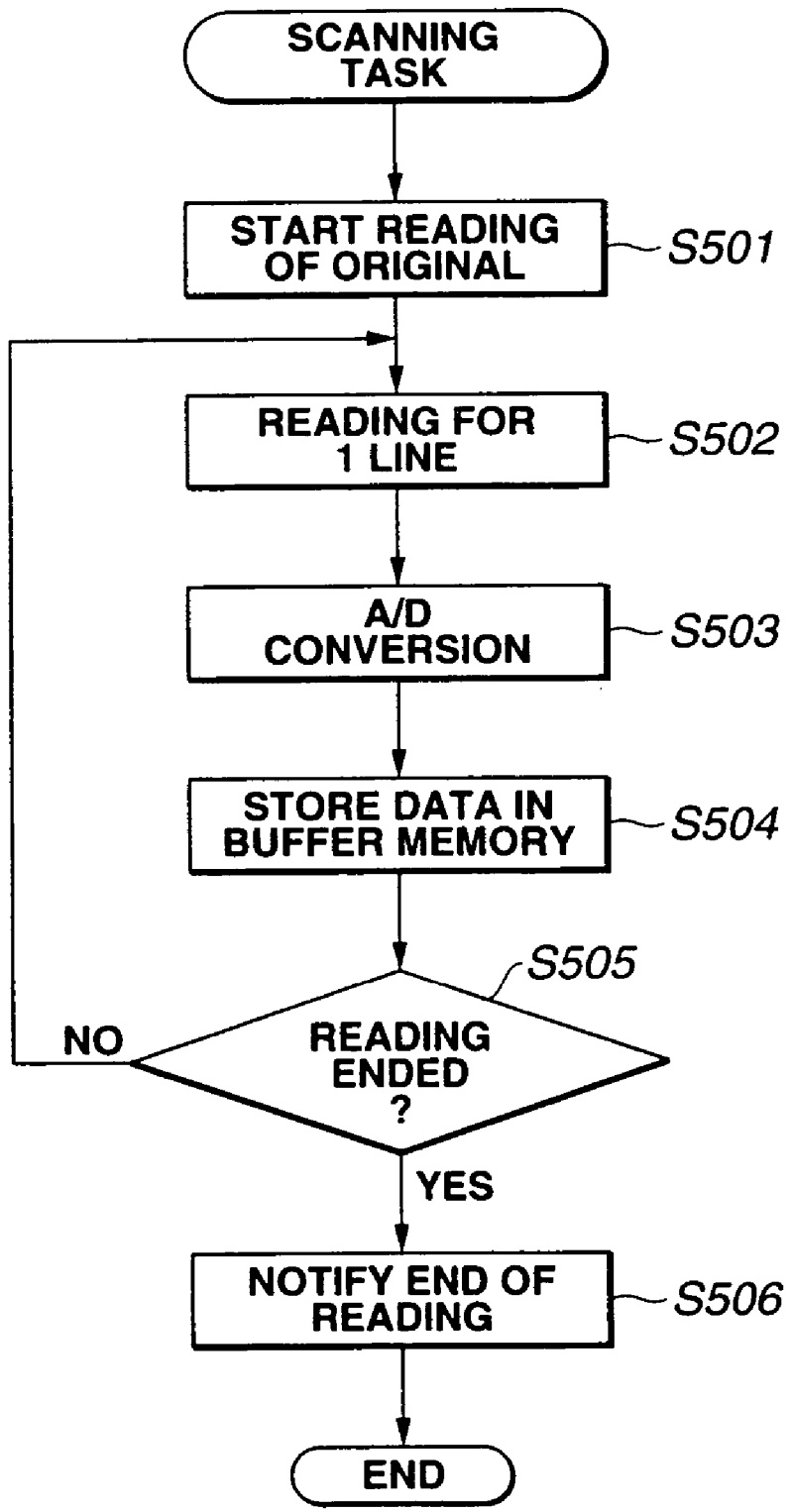
FIG. 10 is a flowchart illustrating the flow of the processing within a scanning task for scanning and reading an image from an original set on a reading unit, as directed by an instruction from the PC.

FIG. 10 illustrates a scanning task for reading an image on an original by the reading unit 34 of the FAX unit as directed by an instruction from the PC 100.

When the scanning task based on a scanning command has been started in step S203, then, in step S501, reading of an image from an original is started by starting the conveyance of the original set on the reading unit 34. When reading for one line has been completed in step S502, then, in step S503, a signal output from the reading sensor is subjected to A/D (analog-to-digital) conversion for each pixel, to provide multi-valued or binary digital data per pixel in accordance with an instruction from the PC 100. In step S504, the obtained data is stored in the buffer memory 38. The processing of steps S502-S505 is repeated until reading processing for one page, or a predetermined reading range, is completed. When it has been determined in step S505 that the reading processing has ended, then, in step S506, a status flag indicating the end of the reading of an original is raised in a predetermined area of the RAM 33. Thus, the end of the reading is relayed to the PC 100 by the monitor task shown in FIG. 6.

FIG. 11 illustrates an uploading control task for uploading data into the PC 100, when there is data to be uploaded into the PC 100 which is stored in the buffer memory 38 (such as image data obtained from the reading unit 34 by the scanning task, facsimile image data received from the telephone network 44, or the like).

When the uploading control task directed by an uploading command has been started in step S205, then, in step S601, it is determined if the data to be uploaded into the PC 100 is present in the buffer memory 38. If the result of the determination in step S601 is affirmative, the process proceeds to step S602, where data for the number of bytes assigned from the PC 100 is transferred via the I/F controller 37. In step S603, the end of data to be uploaded is determined. If the result of the determination in step S603 is affirmative, the process proceeds to step S604, where a status flag indicating the end of the transfer of data to be uploaded is raised in a predetermined area of the RAM 33. Thus, the end of data uploading is relayed to the PC 100 by the monitor task shown in FIG. 6. If the result of the determination in step S603 is negative, the process returns to step S601, and the processing of steps S601-S605 is repeated. When the data transfer for the number of bytes specified by the PC 100 has ended, the uploading control task is temporarily terminated until the next instruction of uploading is received.

Figure 12:
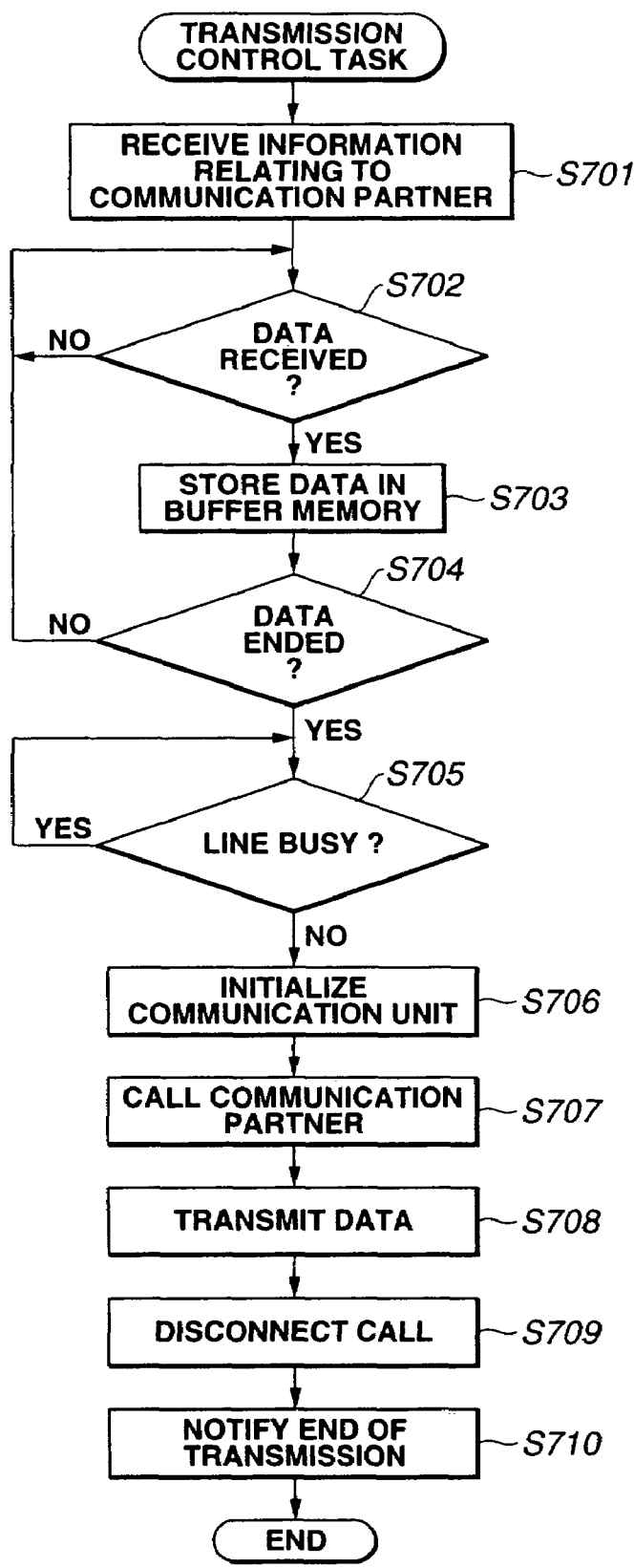
FIG. 12 is a flowchart illustrating the flow of the processing within a transmission control task for transmitting data to be transmitted from the PC to an assigned communication partner, as directed by an instruction from the PC.

FIG. 12 illustrates a transmission control task for executing the FAX transmission of image data to be transmitted, stored in the buffer memory 38 of the facsimile apparatus 1, to an assigned communication partner via the MODEM 35, and the like.

In step S701, the facsimile apparatus 1 receives from the PC 100 address information (such as the telephone number, or the like) of the communication partner to which FAX transmission is to be performed. At that time, information relating to the size, the resolution, and the like, of the data to be transmitted, which is to be received in the next step, is simultaneously received.

In step S702, the image data to be subjected to FAX transmission is received from the PC 100 via the I/F controller 37. In step S703, the received image data is stored in the buffer memory 38. The processing of steps S702-S704 is repeated until it is determined in step S704 that there is no more data.

When data reception has ended, then, in step S705, it is determined if the line is busy via confirming the state of the line by the NCU 36. If the result of the determination in step S705 is affirmative, transmission control is temporarily held in a waiting state, in order to wait until the line becomes available. If the result of the determination in step S705 is negative, the process proceeds to step S706.

In step S706, the MODEM 35 and the NCU 36, both serving as communication units, are initialized in order to prepare for FAX transmission. In step S707, the communication partner for FAX transmission, whose information has been received in step S701, is called using the line. In step S708, the image data stored in the buffer memory 38 is subjected to FAX transmission to the called communication partner via the telephone network 44. In step S709, the call is disconnected when it has been determined that the FAX transmission has ended. In step S710, a status flag indicating the end of reading/transmission is raised in a predetermined area in the RAM 33. Thus, the end of transmission is relayed to the PC 100 by the monitor task shown in FIG. 6.

According to the above-described control flow, data is exchanged between the PC 100 and the facsimile apparatus 1, and the processing of printing data from the PC 100, as well as multitask processing relating to printing, are performed.

According to the above-described configuration, even when recording data from the PC 100 by the facsimile apparatus 1 using an existing printer as its printer unit, it is possible to transmit printing data to the printer unit (based on an instruction from the FAX control unit 11) while the FAX control unit 11 remains retaining main control (initiative), and the FAX control unit 11 can know the state of the printer unit via the I/F controller 39. Furthermore, it is unnecessary to provide a special switch between the FAX unit and the printer unit in order to switch an I/F signal in accordance with an operational mode, and therefore it is possible to simplify the configuration. The FAX control unit 11 can perform various operations while retaining main control, i.e., the FAX control unit 11 can always receive a command for the FAX control unit 11, so that the FAX control unit 11 can receive another command for the FAX control unit 11 (for example, the uploading of data from the reading unit 34 of the facsimile apparatus 1) even while printing processing is performed by downloading data from the PC 100. Hence, parallel processing according to alternative time-division multi-task processing can be easily performed using the buffer memory 38.

Although in this embodiment, an ink-jet method is adopted for the printer unit, the printing method is not limited to the ink-jet method. Any other printing method, such as a laser-beam printing method, or the like, may be adopted, provided that data in a form conforming to an interface for a peripheral apparatus of a PC can be received and printed.

The form of data generated by the printer-data generation driver, i.e., data input to the printer unit, is not limited, provided that the data is printing data. Any encoded data, such as data in a particular encoding form correlated with a recording-head control command, original image data, existing PDL data, or the like, may, of course, be used.

Although in the above-described embodiment, the FAX unit and the printer unit have the FAX control unit and the printer control unit, respectively, and the FAX unit restores printing data generated by the printer-data generation driver, a common controller may be provided, and the controller may restore original printing data from data from the PC (obtained by processing printing data by the command conversion driver) and directly control a printing operation.

In this approach, an existing printer driver and printer engine may also be used, so that the benefits of the present invention can be obtained.

Although in the above-described embodiment, the case of using an existing printer for the facsimile apparatus has been described, the present invention is not limited to such an approach.

For example, an existing scanner for a PC (either having a scanner control unit, or assuming that the FAX control unit has the function of controlling the existing scanner) may be used as the reading unit of the facsimile apparatus. Thus, the PC may acquire a command for reading from an existing scanner driver, add a command for the FAX control unit thereto, and transmit the resultant command to the facsimile apparatus, and the FAX control unit of the facsimile apparatus may transmit the received command to the scanner by removing the portion uniquely directed to the FAX control unit (or control a scanning operation). The FAX control unit may transfer information including image data obtained by reading an image from an original by the scanner to the PC by adding information for application software provided in the PC to the image data.

Thus, it is possible to obtain the same effects as in the case of the above-described printer, in a system using an existing scanner.

The apparatus connected to the PC is not limited to the facsimile apparatus. The present invention may be applied to any system, such as a copier or the like, which uses existing peripheral apparatuses. The present invention may, of course, be applied not only to a system which uses an existing driver, but also to a system which uses at least two types of drivers.

Also, the present invention may, of course, be applied to a case of using a method of transferring data based on a printer driver to the facsimile apparatus by performing switching according to a predetermined method, without performing modification, as described with reference to FIG. 13.

The present invention may be applied to a system comprising a plurality of apparatuses (such as a host computer, an interface apparatus, a reader, a printer, a facsimile unit, and the like), or to an apparatus comprising a single unit (such as a copier connectable to a PC, a facsimile apparatus, or the like).

The present invention may also be applied to a case in which software for realizing the functions of the above-described embodiment is supplied to a computer (a CPU or an MPU (microprocessor unit)) within an apparatus or a system connected to various devices so as to operate the devices so as to realize the functions of the embodiment, and the system or the apparatus operates the devices in accordance with a software program stored in the computer.

In such a case, the software itself realizes the functions of the above-described embodiment, so that the software itself, and the means for supplying the computer with the software, such as a storage medium storing the software, constitutes the present invention.

For example, a floppy disk, a hard disk, an optical disk, a magneto-optical disk, a CD(compact disc)-ROM, a magnetic tape, a nonvolatile memory card, a ROM, or the like, may be used as the storage medium for storing such program codes.

Such program codes, of course, constitute the present invention not only when the functions of the above-described embodiment are realized by execution of supplied program codes by a computer, but also when the functions of the above-described embodiment are realized by cooperation of the program codes with an OS (operating system) operating in a computer, or with other application software.

The present invention may, of course, be applied to a case in which, after storing supplied program codes in a memory provided in a function expansion board of a computer or in a function expansion unit connected to the computer, the CPU, or the like, provided in the function expansion board or the function expansion unit can perform a part, or the entirety, of the actual processing directed by the instructions of the program codes, and the functions of the above-described embodiment are realized by the processing.

As described above, according to the above-described embodiment, in a data processing apparatus, such as a facsimile apparatus, or the like, which uses a processing unit, such as a printer, or the like, operating as a peripheral apparatus which performs processing in accordance with an instruction received from a connected information processing terminal, such as a personal computer, or the like, it is possible to wait for a command in the same state as during execution of other processing even when the processing unit is processing data, and to easily use an existing peripheral apparatus, such as a printer, or the like.

The individual components designated by blocks in the drawings are all well known in the data processing apparatus arts and their specific construction and operation are not critical to the operation or the best mode for carrying out the invention.

While the present invention has been described with respect to what is presently considered to be the preferred embodiment, it is to be understood that the invention is not limited to any disclosed embodiment. To the contrary, the present invention is intended to cover various modifications and equivalent arrangements included within the spirit and scope of the appended claims. The scope of the following claims is to be accorded the broadest interpretation possible so as to encompass all such modifications, equivalent structures, and functions.

What is claimed is:

1. A data processing apparatus comprising:
   a first connector which connects an information processing apparatus having a peripheral apparatus driver for controlling a predetermined peripheral apparatus and an application for performing a process different from the peripheral apparatus driver;
   a second connector which connects a peripheral apparatus to be controlled by the peripheral apparatus driver;
   an accepting unit which accepts an instruction sent from the information processing apparatus through said first connector;
   a conversion unit which deletes data generated by the application from the instruction, accepted by the accepting unit, including data generated by the peripheral apparatus driver and data generated by the application; and
   a processing unit which causes the peripheral apparatus connected through said second connector to operate in accordance with the instruction converted by the conversion unit.

2. The data processing apparatus according to claim 1, wherein the peripheral apparatus is a printer which prints an image and the peripheral apparatus driver is a printer driver.

3. The data processing apparatus according to claim 1, wherein the peripheral apparatus is a scanner which scans a document and generates image data based on an image of the document and the peripheral apparatus driver is a scanner driver.

4. The data processing apparatus according to claim 3, wherein the processing unit adds information for causing the application to process the image data obtained by scanning the document and transfers the image data with the added information to the information processing apparatus connected through the second connector.

5. A controlling method of a data processing apparatus having a first connector which connects an information processing apparatus having a peripheral apparatus driver for controlling a predetermined peripheral apparatus and an application for performing a process different from the peripheral apparatus driver and a second connector which connects a peripheral apparatus to be controlled by the peripheral apparatus driver, the controlling method comprising the steps of:
   accepting an instruction sent from the information processing apparatus through the first connector;
   deleting data generated by the application from the instruction, accepted in the accepting step, including data generated by the peripheral apparatus driver and data generated by the application; and
   causing the peripheral apparatus connected through the second connector to operate in accordance with the instruction processed by performance of the deleting step.

6. A storage medium which stores a computer readable program for controlling a data processing apparatus having a first connector which connects an information processing apparatus having a peripheral apparatus driver for controlling a predetermined peripheral apparatus and an application for performing a process different from the peripheral apparatus driver and a second connector which connects a peripheral apparatus to be controlled by the peripheral apparatus driver, the program comprising the steps of:
   accepting an instruction sent from the information processing apparatus through the first connector;
   deleting data generated by the application from the instruction, accepted in the accepting step, including data generated by the peripheral apparatus driver and data generated by the application; and
   causing the peripheral apparatus connected through the second connector to operate in accordance with the instruction processed by performance of the deleting step.

* * * * *